United States Patent [19]

Princiotta

[11] Patent Number: 5,239,718
[45] Date of Patent: Aug. 31, 1993

[54] ARCHERY TOOL APPARATUS

[76] Inventor: Michael A. Princiotta, 168 Line Rd., Trenton, N.J. 08690

[21] Appl. No.: 872,847

[22] Filed: Apr. 23, 1992

[51] Int. Cl.⁵ .............................................. B25F 1/00
[52] U.S. Cl. ......................................... 7/169; 239/36
[58] Field of Search ........................ 7/169, 170; 43/2; 239/36, 44, 55

[56] References Cited

U.S. PATENT DOCUMENTS

| | | | |
|---|---|---|---|
| 3,835,489 | 9/1974 | Lagace et al. ........................... | 7/170 |
| 4,553,280 | 11/1985 | Stright ................................. | 7/169 X |
| 4,609,245 | 9/1986 | Sakschek ............................... | 239/36 |

FOREIGN PATENT DOCUMENTS 426629  2/1911  France ................................... 7/169

Primary Examiner—James G. Smith
Attorney, Agent, or Firm—Leon Gilden

[57] ABSTRACT

An archery tool apparatus construction includes a support shank having a thread tap coaxially aligned, with the support shank mounted to a lower distal end thereof. A handle shank is mounted fixedly, orthogonally, and medially of itself to an upper distal end of the support shank. The invention is further arranged to include a squeeze bulb having a fluid reservoir therewithin to project fluid such as animal attractant through the handle shank into surrounding fluid absorbent sponge cylindrical grips.

3 Claims, 4 Drawing Sheets

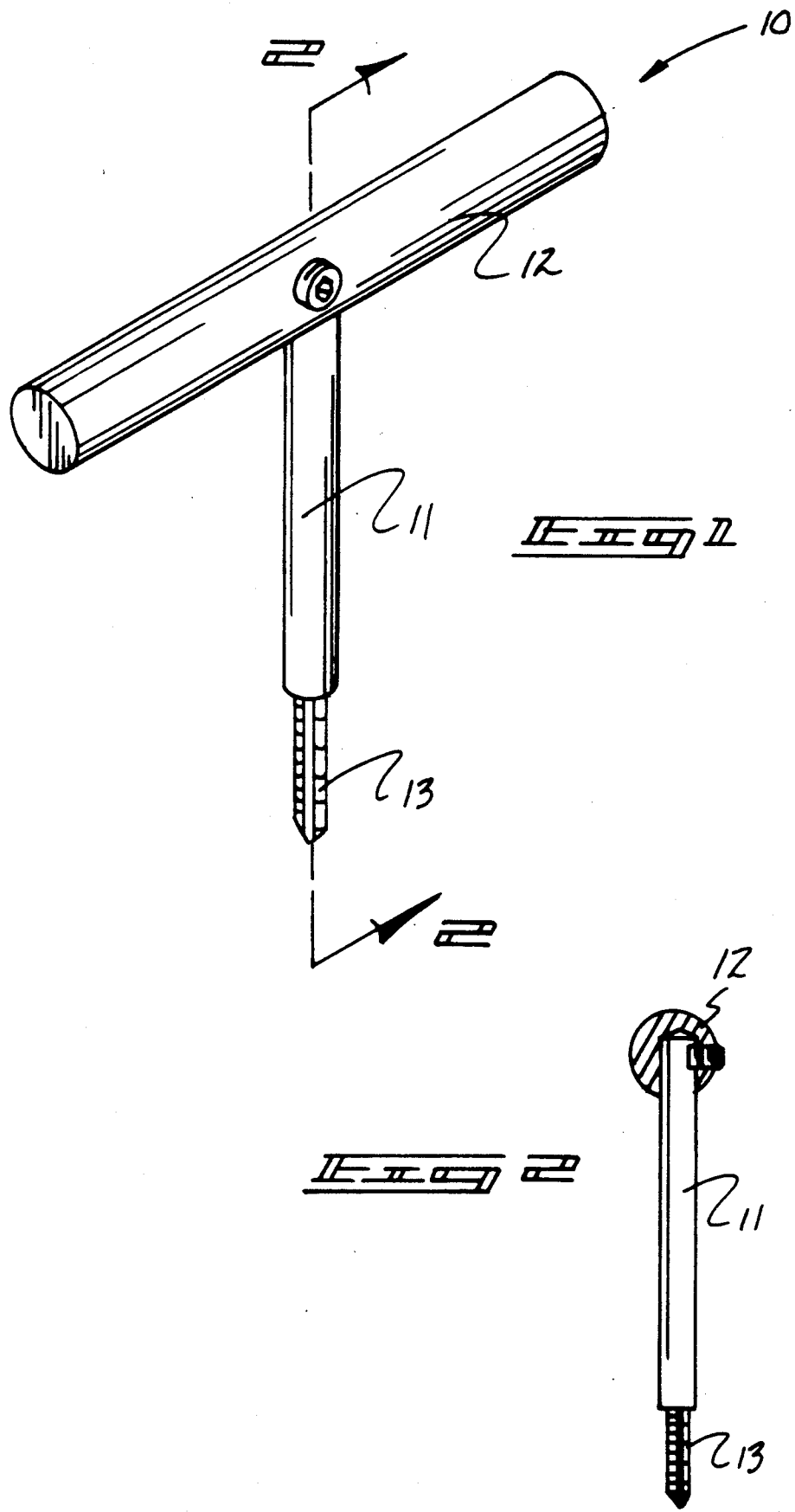

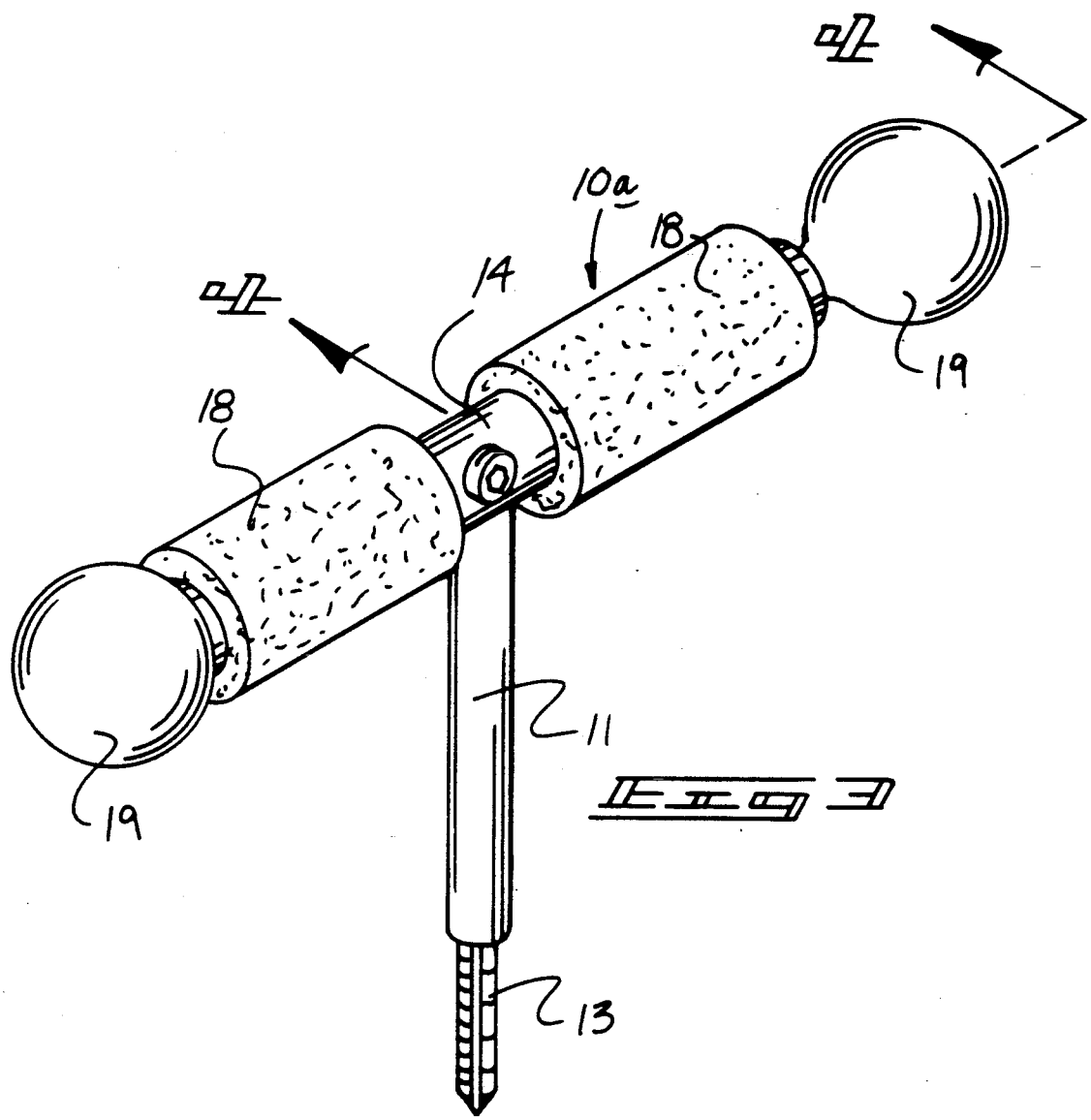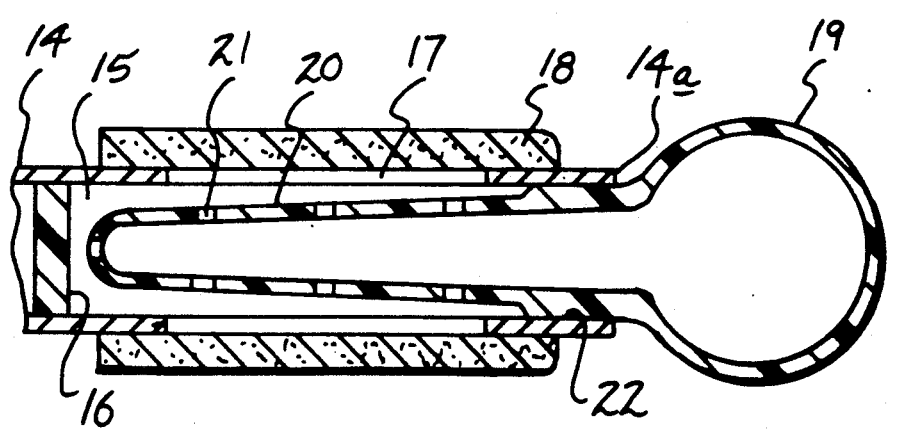

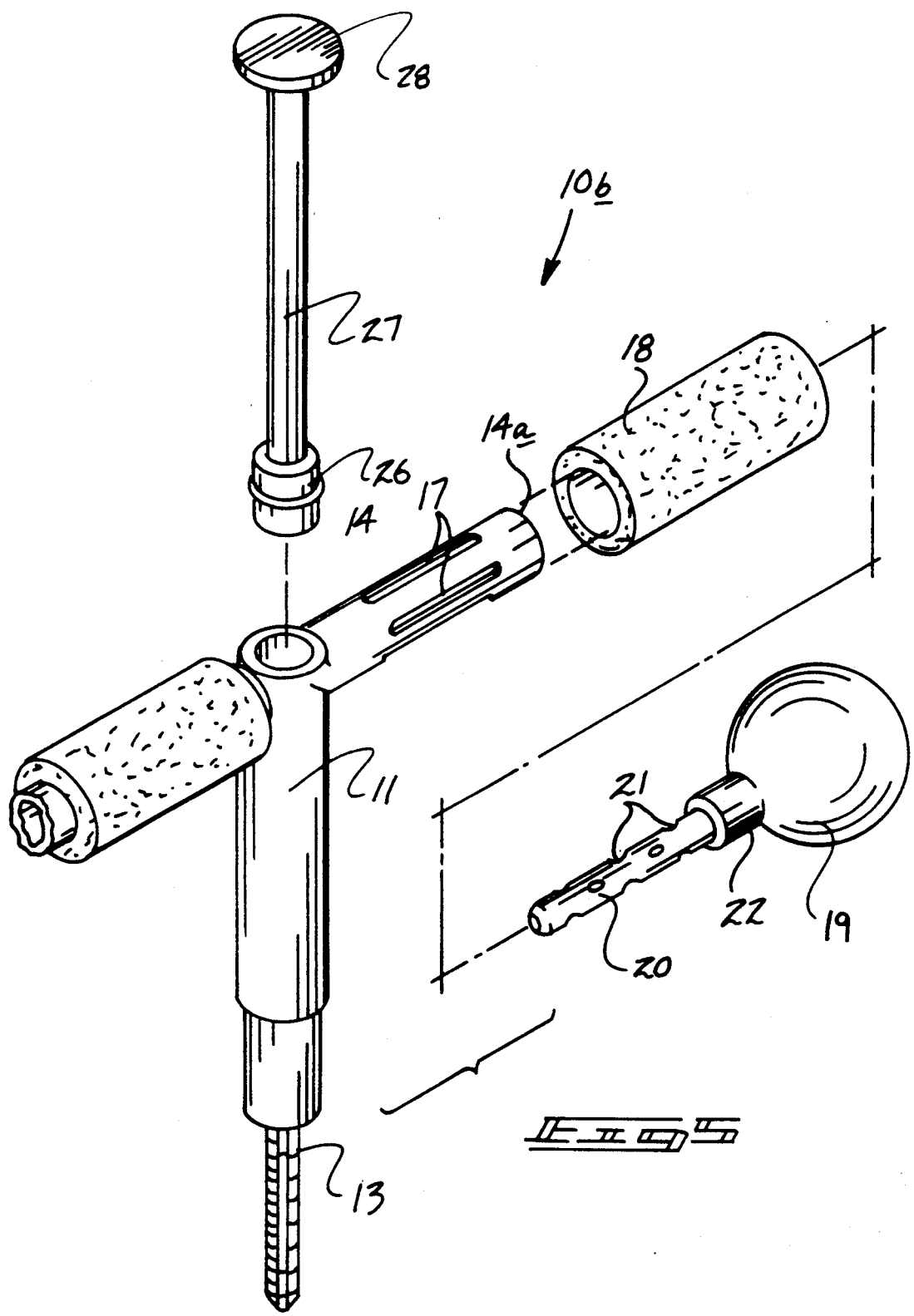

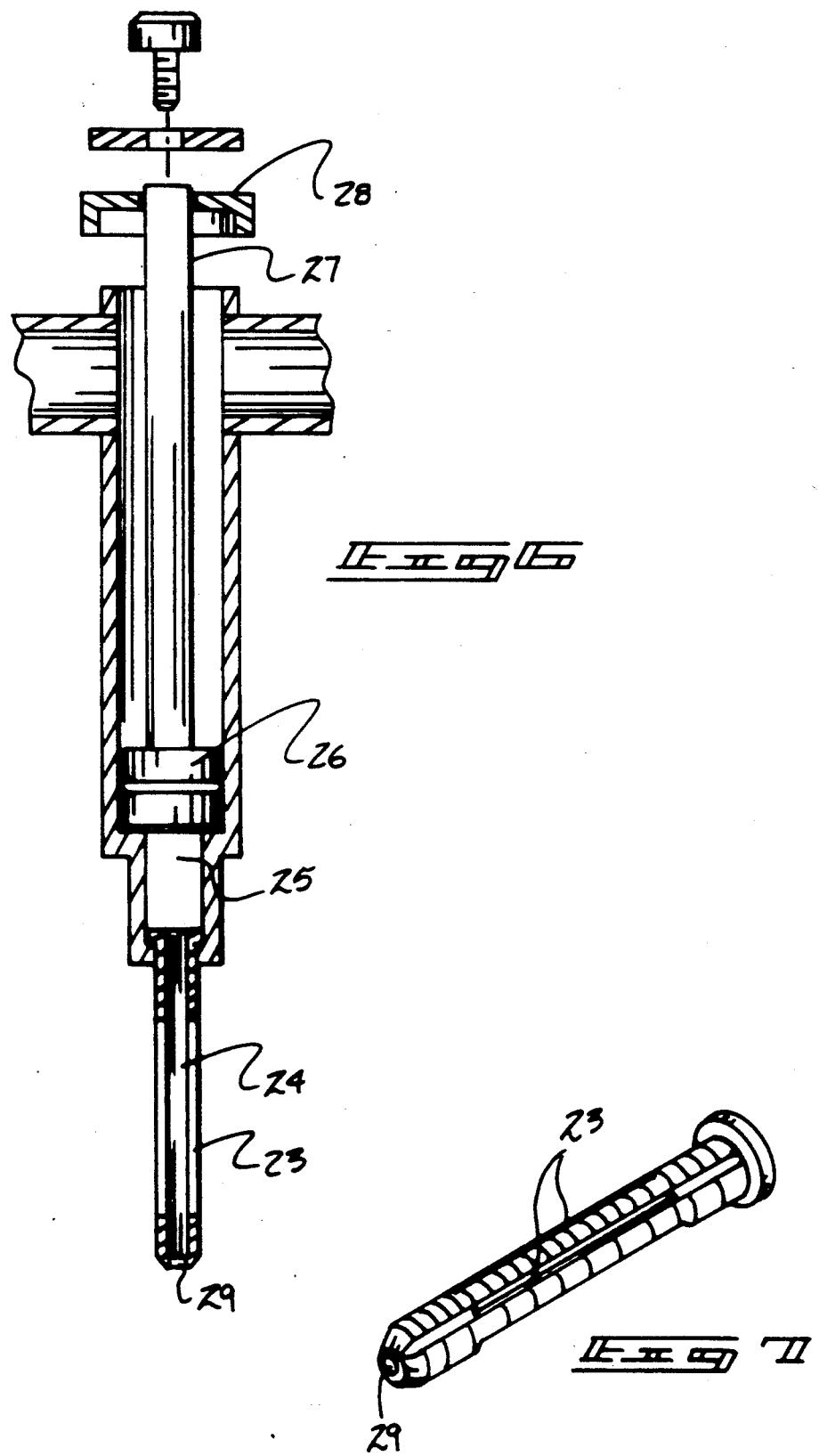

ARCHERY TOOL APPARATUS

BACKGROUND OF THE INVENTION

1. Field of the Invention

The field of invention relates to archery apparatus, and more particularly pertains to a new and improved archery tool apparatus wherein the same is arranged to provide for a thread tap to effect cleaning of threads of an archery tip relative to an associated support shaft, as well as providing a source of animal attractant for use in a bow hunting event.

2. Description of the Prior Art

To maintain continued use of archery arrows relative to an archery shaft, periodic cleaning of the threads securing the archery tip relative to its support shaft is required. The instant invention provides for a convenient tool to effect such periodic cleaning, as well as providing for a source of animal attractant for use in an archery and bow hunting event.

Various thread taps and the like are utilized in the prior art but have heretofore failed to address a need directed specifically to bow hunting and the like availed by the instant invention.

Accordingly, it may be appreciated that there continues to be a need for a new and improved archery tool apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of archery apparatus now present in the prior art, the present invention provides an archery tool apparatus wherein the same is directed to the periodic cleaning of threads relative to an archery shaft and associated arrow tip typically threaded into the archery shaft. As such, the general purpose of the present invention, which will be described subsequently in greater detail, is to provide a new and improved archery tool apparatus which has all the advantages of the prior art archery apparatus and none of the disadvantages.

To attain this, the present invention provides an archery tool apparatus including a support shank having a threaded tap coaxially aligned, with the support shank mounted to a lower distal end thereof. A handle shank is mounted fixedly, orthogonally, and medially of itself to an upper distal end of the support shank. The invention is further arranged to include a squeeze bulb having a fluid reservoir therewithin to project fluid such as animal attractant through the handle shank into surrounding fluid absorbent sponge cylindrical grips.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved archery tool apparatus which has all the advantages of the prior art archery apparatus and none of the disadvantages.

It is another object of the present invention to provide a new and improved archery tool apparatus which may be easily and efficiently manufactured and marketed.

It is a further object of the present invention to provide a new and improved archery tool apparatus which is of a durable and reliable construction.

An even further object of the present invention is to provide a new and improved archery tool apparatus which is susceptible of a low cost of manufacture with regard to both materials and labor, and which accordingly is then susceptible of low prices of sale to the consuming public, thereby making such archery tool apparatus economically available to the buying public.

Still yet another object of the present invention is to provide a new and improved archery tool apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic view, taken along the lines 2—2 of FIG. 1 in the direction indicated by the arrows.

FIG. 3 is an isometric illustration of a modification of the invention.

FIG. 4 is an orthographic view, taken along the lines 4—4 of FIG. 3 in the direction indicated by the arrows.

FIG. 5 is an isometric illustration of a further modification of the invention.

FIG. 6 is an orthographic cross-sectional illustration of the invention as set forth in FIG. 5, illustrating the communication of the central plunger structure relative to the tubular thread tap.

FIG. 7 is an isometric illustration of the tubular thread tap as illustrated in FIG. 6.

DESCRIPTION OF THE PREFERRED EMBODIMENT

With reference now to the drawings, and in particular to FIGS. 1 to 7 thereof, a new and improved archery tool apparatus embodying the principles and concepts of the present invention and generally designated by the reference numerals 10, 10a, and 10b will be described.

More specifically, the archery tool apparatus 10, as illustrated in the FIGS. 1 and 2, essentially comprises a support shank 11 formed of an elongate longitudinally aligned member having a handle shank 12 orthogonally mounted medially of itself relative to an upper distal end of the support shank 11. A thread tap 13 is fixedly mounted to a lower distal end of the support shank 11 coaxially aligned therewith. In this manner, the typical threaded interconnection between an arrow head and the arrow shaft threaded interconnection is conveniently cleaned by the tool structure.

The apparatus 10a, as illustrated in the FIGS. 3 and 4, includes the use of a modified tubular handle shank 14 having spaced handle cavities 15 that are coaxially aligned on opposed sides of the support shank 11, with a fluid containment wall 16 mounted in a spaced relationship from a handle shank outer distal end 14a, as illustrated in FIG. 4. In this manner, a plurality of such spaced handle cavities 15 are available, with a sponge cylinder 18 mounted in surrounding relationship relative to each handle cavity about the handle shank 14. A squeeze bulb 19 projects exteriorly of the handle shank's outer distal end for containment of fluid, such as animal attractant therewithin, and includes a squeeze bulb projecting conduit 20 in fluid communication with the squeeze bulb 19 that is directed into the handle cavity 15 within the containment wall 16. The projecting conduit 20 includes a plurality of conduit apertures 21 to direct the aforenoted fluid from the projecting conduit into the sponge cylinder 18 through handle slots 17 within the handle 14. To maintain positioning of the squeeze bulb and the projecting conduits 19 and 20 respectively relative to each handle cavity 15, the squeeze bulb includes a squeeze bulb collar 22 arranged at an intersection between the squeeze bulb and projecting conduit to frictionally secure the projecting conduit within the cavity 15.

The apparatus 10b, as illustrated in the FIGS. 5-7, further includes the thread tap 13 formed with an elongate tap longitudinal central bore 24 in pneumatic and fluid communication with the support shank central bore 25 that is directed through the support shank having a piston 26 sealingly contained therewithin, with the piston 26 including a piston rod 27 projecting upwardly and coaxially of the support shank central bore 25 terminating in a piston rod handle 28 positioned above the handle shank 14. The threaded tap 13 includes the tap central bore 24 terminating in a lower tap outlet opening 29, as well as tap longitudinal slots 23. In this manner, during a tapping procedure, the piston rod 27 is lifted to pneumatically draw various chips into the tap central bore 24 through the tap longitudinal slot 23 and the tap lower outlet opening 29. Further if desired, a tap cutting and/or lubricating fluid may be positioned initially within the support shank central bore 25 to direct such fluid through the support shank's central bore 25 into the tap central bore 24 directed therefrom into threads to be cut and cleaned within a typical arrow shaft (not shown) of conventional construction.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An archery tool apparatus comprising,
   a support shank, the support shank having a shank lower distal end and a shank upper distal end, the shank lower distal end having a thread tap fixedly mounted to the shank lower distal end extending longitudinally thereof, and
   a tubular handle shank fixedly mounted medially of itself adjacent the handle shank upper distal end, with the handle shank orthogonally oriented relative to the support shank, and
   the handle shank is of a tubular construction having spaced handle shank outer distal ends, the tubular handle shank includes at least one handle cavity directed into the tubular handle shank from at least one of said handle shank outer distal ends terminating in a fluid containment wall within the handle shank spaced from the support shank, and a squeeze bulb formed of a shape retentent material arranged to receive a fluid therewithin, including a squeeze bulb projecting conduit, the squeeze bulb projecting conduit directed into the at least one handle cavity.

2. An apparatus as set forth in claim 1 wherein the squeeze bulb includes a squeeze bulb collar formed at a junction of the squeeze bulb and the projecting conduit, with the squeeze bulb collar frictionally retained within the handle cavity, and the handle shank including a plurality of handle slots directed through the handle shank into the at least one handle cavity into fluid communication with the handle cavity, and at least one sponge cylinder mounted about the handle shank in surrounding relationship relative to the at least one handle cavity, with the projecting conduit including a plurality of conduit apertures directed through the projecting conduit to direct fluid from the squeeze bulb into the sponge cylinder through the handle slots.

3. An apparatus as set forth in claim 2 wherein the thread tap includes a thread tap central bore and a thread tap lower outlet opening at a lower distal end of the thread tap, and the thread tap further including thread tap longitudinal slots directed through the thread tap above the tap lower outlet opening, and the support shank including a support shank central bore in pneumatic communication with the tap central bore, and the support shank central bore having a piston frictionally and slidably received within the support shank central bore, the piston including a piston rod mounted to the piston, with the piston rod extending coaxially through the support shank central bore projecting above the handle shank, with the piston rod including a piston rod handle mounted to the piston rod above the handle shank.

* * * * *